Sept. 1, 1964   W. A. MOORE   3,146,546
DEVICE FOR APPLYING A LIQUID TO THE FEET OF ROOSTING BIRDS
Filed May 24, 1963
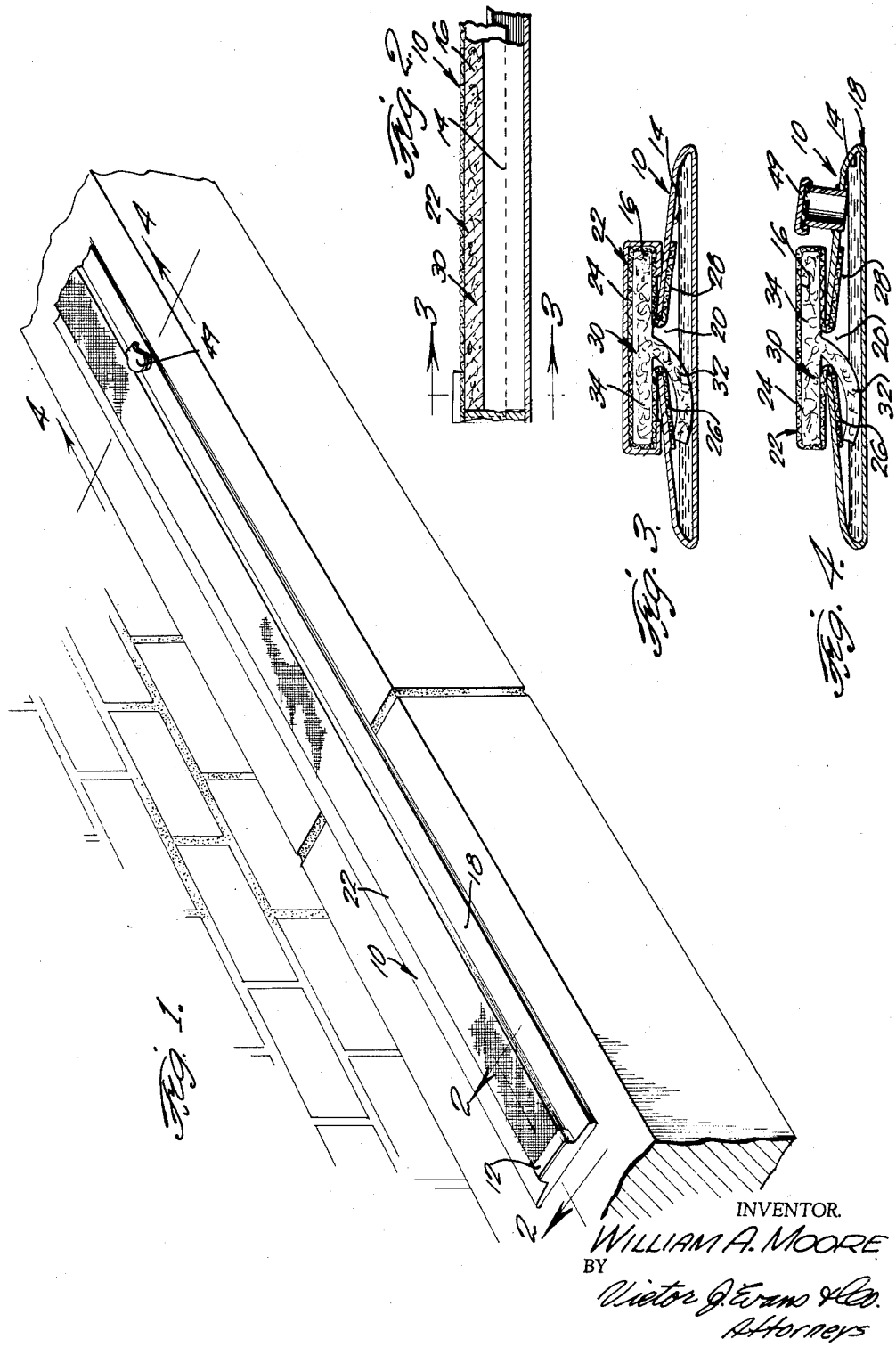
INVENTOR.
WILLIAM A. MOORE
BY
Victor J. Evans & Co.
Attorneys

United States Patent Office 3,146,546
Patented Sept. 1, 1964

3,146,546
DEVICE FOR APPLYING A LIQUID TO THE FEET OF ROOSTING BIRDS
William A. Moore, Muscatine, Iowa, assignor to Rid-A-Bird, Inc., Muscatine, Iowa, a corporation of Iowa
Filed May 24, 1963, Ser. No. 283,030
6 Claims. (Cl. 43—131)

The present invention relates to a device for applying a liquid to the feet of roosting birds.

The presence of roosting sparrows, pigeons, starlings, and the like on city buildings is frequently a health hazard to the city population and is generally considered obnoxious. Various devices have been proposed in the past and have been employed to rid a building of such birds but few of the devices are successful to any degree or for any length of time.

An object of the present invention is to provide a device for applying liquid to the feet of roosting birds so that the birds are killed by the liquid.

Another object of the present invention is to provide a device for applying a liquid to the feet of roosting birds which may be employed either under cover or out in the open where the device is subject to inclement weather.

A further object of the present invention is to provide a device for applying liquid to the feet of roosting birds which may be installed in any place where birds roost with ease and facility, one which requires little or no attention after being installed, one which is economical to manufacture in quantity at reasonable cost, and one which is highly effective in action.

These and other object and advantages of the present invention will be fully apparent from the following description when taken in connection with the annexed drawings, in which:

FIGURE 1 is a perspective view of a ledge on a building wall showing the device of the present invention installed thereon.

FIGURE 2 is a view on an enlarged scale, taken on the line 2—2 of FIGURE 1,

FIGURE 3 is a view taken on the line 3—3 of FIGURE 2, and

FIGURE 4 is a view taken on the line 4—4 of FIGURE 1 and on an enlarged scale.

Referring in detail to the drawings in which like numerals indicate like parts throughout the several views, the device as shown in FIGURES 1 to 4, inclusive, consists in a horizontally disposed elongated hollow member 10 having closed ends, as at 12 in FIGURE 1 in which one end is shown. The member 10 is provided with a lower chamber 14 having liquid impervious walls and with an upper chamber 16 having reticulated walls.

The lower chamber 14 is formed by an elongated hollow substantially flat tube member 18 having a slot 20 in the upper portion thereof, the slot 20 extending from one end to the other end of the member 18. The upper chamber 16 is formed by an elongated flat strip fabricated of a reticulated material such as a close mesh wire cloth, the strip being designated generally by the reference numeral 22. The strip 22 is folded upon itself to form a horizontally disposed upper surface portion 24 and depending skirt portions 26 and 28 along each of the side edges of the portion 24.

The skirt portions 26 and 28 are bent inwardly upon themselves to substantially V-shape so that their lower ends project into the chamber 14 through the slot 20.

A wick element 30 has a first portion 32 within the chamber 14 and in the slot 20 and a second portion 34, formed integrally with the portion 32, completely filling the chamber 16 below the upper surface portion 24 of the strip 22.

In the form of the invention shown and described, a filler opening is provided, so that the lower chamber 14 may be supplied with a liquid which poisons a bird by absorption through the feet of the bird. The opening is designated by the reference numeral 49 and consists in an oil type filling device.

The wick element 30 forms a means by which the poisonous liquid is carried from the lower chamber to the upper chamber for saturating the wire mesh or wire cloth strip 22. A feature of the invention is that the device may be used where it is exposed to the weather because of the fine mesh of the strip 22 is such that the rain does not penetrate the screen mesh into the associated wick to mix with the poison contained in the wick.

While only a preferred form of the invention is shown and described, other forms of the invention are contemplated and numerous changes and modifications may be made in the invention without departing from the spirit thereof as set forth in the appended claims.

What is claimed is:

1. A device for applying liquid material to the feet of roosting birds comprising a horizontally disposed elongated hollow member having closed ends, said member being adapted to rest upon a surface upon which birds are accustomed to perch, said member being provided with a lower chamber having liquid impervious walls and with an upper chamber having reticulated walls, and means within said member adapted to carry liquid when in said lower chamber from said lower chamber to said upper chamber.

2. A device for applying a liquid material to the feet of roosting birds comprising a horizontally disposed hollow member having closed ends, said member being adapted to rest upon a surface upon which birds are accustomed to perch, said member being provided with a lower chamber having liquid impervious walls and with an upper chamber having reticulated walls, and a wick element extending within said member and having a portion disposed in said lower chamber and having a portion disposed in said upper chamber, said wick element being adapted to carry liquid when in said lower chamber from said lower chamber to said upper chamber.

3. A device for applying a liquid material to the feet of roosting birds comprising a horizontally disposed hollow member having closed ends, said member being adapted to rest upon a surface upon which birds are accustomed to perch, said member being provided with a lower chamber having liquid impervious walls and with an upper chamber having reticulated walls, and a wick element extending within said member and having a portion disposed in said lower chamber and having a portion disposed in said upper chamber, said wick element being adapted to carry liquid when in said lower chamber from said lower chamber to said upper chamber, said lower chamber being provided with filler openings.

4. A device for applying a liquid material to the feet of roosting birds comprising a horizontally disposed hollow member having closed ends, said member being adapted to rest upon a surface upon which birds are accustomed to perch, said member being provided with a lower chamber having liquid impervious walls and with an upper chamber having reticulated walls fabricated of close mesh wire cloth, and a wick element extending within said member and having a portion disposed in said lower chamber and having a portion disposed in said upper chamber, said wick element being adapted to carry liquid when in said lower chamber from said lower chamber to said upper chamber.

5. A device for applying liquid material to the feet of roosting birds comprising a horizontally disposed elongated hollow substantially flat tube member having closed ends and a slot in the upper portion extending from one end to the other end thereof, an elongated flat strip fabricated of a reticulated material, said strip being folded upon itself to form a horizontally disposed upper surface portion and a depending skirt portion along each side edge of said upper surface portion, the skirt portions extending through said slot into said tube member, and an elongated wick element having one portion disposed in said tube member and said slot and a second portion completely filling the space below said upper surface portion, said wick element being adapted to carry liquid when in said tube member into the space below said upper surface portion of said strip.

6. A device for applying liquid material to the feet of roosting birds comprising a horizontally disposed elongated hollow tube member having closed ends and a slot in the upper portion extending from one end to the other end thereof, an elongated flat strip fabricated of a reticulated material, said strip being folded upon itself to form a horizontally disposed upper surface portion and a depending skirt portion along each side edge of said upper surface portion, the skirt portions extending through said slot into said tube member, and an elongated wick element having one portion disposed in said tube member and said slot and a second portion completely filling the space below said upper surface portion, said wick element being adapted to carry liquid when in said tube member into the space below said upper surface portion of said strip.

References Cited in the file of this patent
UNITED STATES PATENTS

| | | |
|---|---|---|
| 1,233,533 | Wilkins | July 17, 1917 |
| 1,351,456 | Windahl | Aug. 31, 1920 |
| 1,566,970 | Ridgley | Dec. 22, 1925 |